United States Patent
Lesecq et al.

(10) Patent No.: US 10,002,079 B2
(45) Date of Patent: Jun. 19, 2018

(54) METHOD OF PREDICTING A DATUM TO BE PRELOADED INTO A CACHE MEMORY

(71) Applicant: Commissariat a l'energie atomique et aux energies alternatives, Paris (FR)

(72) Inventors: Suzanne Lesecq, Froges (FR); Henri-Pierre Charles, Grenoble (FR); Stephane Mancini, Grenoble (FR); Lionel Vincent, Fontaine (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 0 days. days.

(21) Appl. No.: 15/380,066

(22) Filed: Dec. 15, 2016

(65) Prior Publication Data

US 2017/0168947 A1    Jun. 15, 2017

(30) Foreign Application Priority Data

Dec. 15, 2015 (FR) ..................................... 15 62435

(51) Int. Cl.
*G06F 12/12* (2016.01)
*G06F 12/0862* (2016.01)
(Continued)

(52) U.S. Cl.
CPC ......... *G06F 12/0862* (2013.01); *G06N 5/022* (2013.01); *G06N 7/005* (2013.01);
(Continued)

(58) Field of Classification Search
CPC .............................. G06F 12/0862; G06N 5/022
(Continued)

(56) References Cited

U.S. PATENT DOCUMENTS 5,305,389 A    4/1994  Palmer
6,134,643 A    10/2000 Kedem et al.
(Continued)

OTHER PUBLICATIONS

French Search Report (with Written Opinion) dated Aug. 17, 2016 in French Application 15 62435 filed Dec. 15, 2015 (with English Translation of Categories of Cited Documents).
(Continued)

*Primary Examiner* — Jae Yu
(74) *Attorney, Agent, or Firm* — Oblon, McClelland, Maier & Neustadt, L.L.P.

(57) ABSTRACT

A datum to be preloaded includes the acquisition of a, so-called "model", statistical distribution of the deltas of a model access sequence, the construction of a, so-called "observed", statistical distribution of the deltas of an observed access sequence, the identification in the observed statistical distribution, by comparing it with the model statistical distribution, of the most deficient class, that is to say of the class for which the difference NoDSM−NoDSO is maximal, where NoDSM and NoDSO are the numbers of occurrences of this class that are deduced, respectively, from the model statistical distribution and from the observed statistical distribution, the provision as prediction of the datum to be preloaded into the cache memory, of at least one predicted address where the datum to be preloaded is contained, this predicted address being constructed on the basis of the most deficient class identified.

10 Claims, 3 Drawing Sheets

(51) Int. Cl.
*G06N 5/02* (2006.01)
*G06N 7/00* (2006.01)

(52) U.S. Cl.
CPC ............ *G06F 2212/1024* (2013.01); *G06F 2212/6024* (2013.01); *G06F 2212/6026* (2013.01)

(58) Field of Classification Search
USPC ........................................................ 711/137
See application file for complete search history.

(56) References Cited

U.S. PATENT DOCUMENTS

| | | | |
|---|---|---|---|
| 6,721,870 | B1 | 4/2004 | Yochai et al. |
| 2002/0056028 | A1* | 5/2002 | Chang ................ G06F 12/0804 711/143 |
| 2004/0123041 | A1 | 6/2004 | Krishnaiyer et al. |
| 2012/0054449 | A1 | 3/2012 | Hu et al. |
| 2013/0007016 | A1 | 1/2013 | Saxena |

OTHER PUBLICATIONS

Doug Joseph, et al., "Prefetching using Markov Predictors", ACM, 1997, 12 pgs.

\* cited by examiner

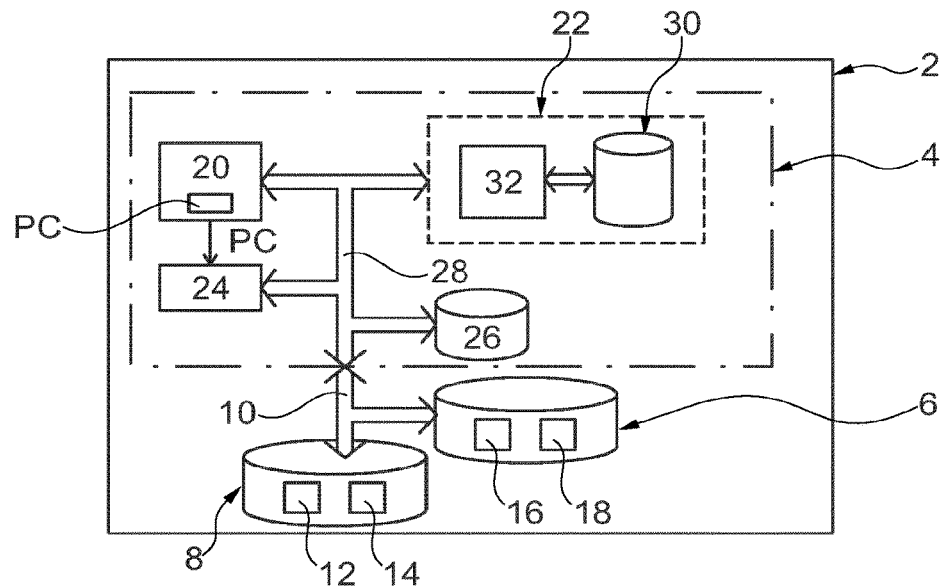
Fig. 1
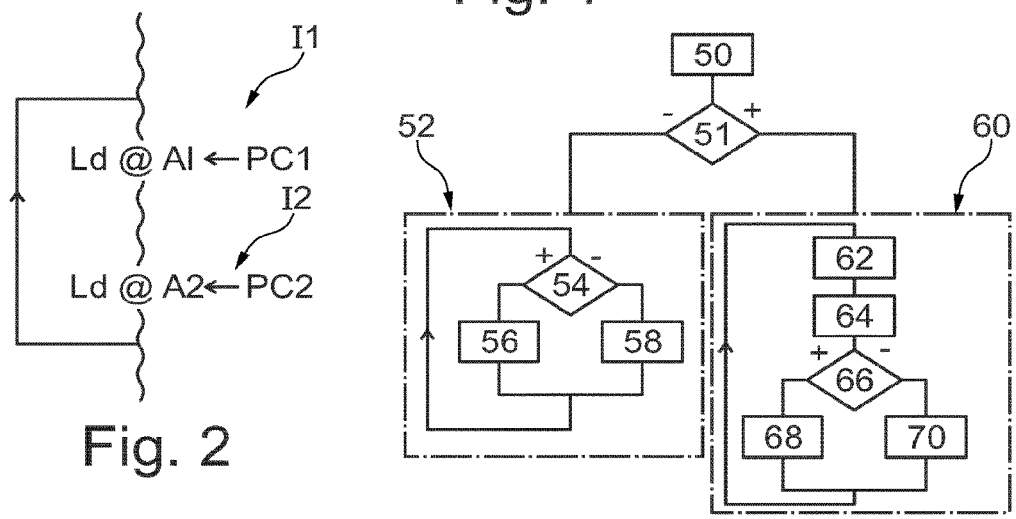
Fig. 2
Fig. 3
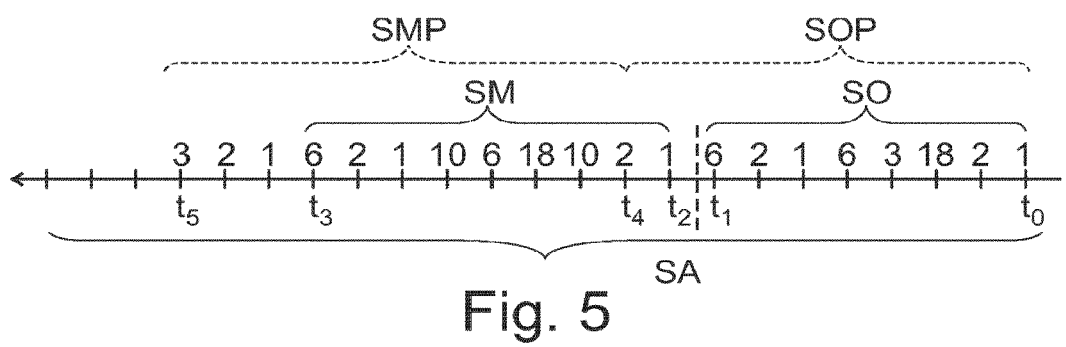
Fig. 5

METHOD OF PREDICTING A DATUM TO BE PRELOADED INTO A CACHE MEMORY

The invention relates to a method for predicting a datum to be preloaded into a cache memory, as well as to a method for executing a program implementing this prediction method. The invention also relates to an information recording medium and to an electronic module for the implementation of this prediction method.

It is very important to predict as correctly as possible the datum to be preloaded into a cache memory since this limits the "cache misses". This therefore limits the number of times that the microprocessor must fetch the datum which it wishes to access from another memory that is not as fast as the cache memory. Indeed, if the prediction is correct, the datum which the microprocessor wishes to access has then been preloaded into the cache memory even before the microprocessor executes the instruction to read this datum. Henceforth, when it executes this read instruction, it can very rapidly obtain the datum which it wishes to access. Conversely, in case of a cache miss, the time taken by the microprocessor to read the datum in another memory is longer. Because of this, this time taken to read in a memory other than the cache memory is called a "penalty". Thus, by limiting the number of cache misses, it is possible to improve the performance and therefore to accelerate the execution of a program by the microprocessor.

Numerous methods for predicting the datum to be preloaded into the cache memory have already been proposed. For example, such methods have been described in the following documents:
U.S. Pat. No. 5,305,389 A1, and
Joseph D., Grunwald D., "Prefetching using Markov predictors", Computers, IEEE transactions, vol. 48, no. 2, pp. 121-133, February 1999.

In particular, certain known methods comprise:
a) for each instant t at which a microprocessor executes an instruction to read a datum necessary for the execution of a program, the calculation of a difference, called delta, between the address of the datum to be read contained in this read instruction executed at the instant t and the address of the datum to be read contained in this same read instruction during its previous execution at an instant t−1, two read instructions being the same if they both correspond to the same value of the program counter of the microprocessor, and
b) the storage of an observed access sequence containing only the N deltas calculated successively for each instant t lying within a sliding window $[t_1; t_0]$, where the instants $t_0$ and $t_1$ are equal to the most recent and the oldest instants t, respectively, for which a delta of the observed access sequence has been calculated, and the number N is a predetermined integer number greater than or equal to two.

In the known methods, the next delta of the observed access sequence is predicted by comparing the observed access sequence with a model access sequence. In this context, the model access sequence is often called a "pattern". It entails a predetermined temporal succession of deltas which repeats several times during the execution of the program.

For example, if the model access sequence is the temporal string of following deltas: 1, 2, 3, 4, 3, 2 and if the observed access sequence is the following string: 1, 2, 3, 4, 3, then the known methods predict that the next delta will very probably have the value 2. Accordingly, the known methods identify the value of the delta to be added to the observed access sequence which maximizes the temporal correlation with the model access sequence. Thereafter, the datum to be preloaded into the cache memory is the datum recorded at the address deduced on the basis of this predicted delta and of the address that was read during the last execution of the read instruction.

Conversely, if the observed access sequence is the sequence 4, 3, 1, 2, 3, the known methods note that the string 4, 3, 1, 2, 3 is not correlated temporally with the model access sequence 1, 2, 3, 4, 3, 2. Consequently, in this case, the known methods are not capable of providing a datum to be preloaded into the cache memory.

The objective of the present invention is to propose an improved method for predicting the datum to be preloaded into the cache memory. Its subject is therefore such a method.

In the claimed method, a model statistical distribution is used to identify the predicted delta which has the most chance of being calculated for the following instant t. More precisely, in the claimed method, it is considered that the predicted delta which has the most chance of occurring is that which makes it possible to minimize the differences between the model statistical distribution and the observed statistical distribution. By virtue of this approach, it is not necessary that a perfect temporal correlation exist between a model access sequence and the observed access sequence in order to be capable of predicting the next datum to be preloaded. For example, returning to the example hereinabove where the model access sequence is 1, 2, 3, 4, 3, 2, the model statistical distribution associated with this sequence associates with the values 1, 2, 3 and 4 the numbers of occurrences, respectively, 1, 2, 2, 1. Stated otherwise, the model statistical distribution indicates that in the model access sequence, the value 1 appears just once, the value 2 appears twice, the value 3 appears twice and the value 4 appears once.

If the observed access sequence is 4, 3, 1, 2, 3, the observed statistical distribution constructed for this observed access sequence associates the values 1, 2, 3, 4 respectively with number of occurrences 1, 1, 2, 1. It is therefore seen that the next delta of the access sequence which would enable the observed statistical distribution to be brought as close as possible to the model statistical distribution is a predicted delta whose value is equal to 2. Thus, under these conditions, the claimed method is capable of predicting a datum to be preloaded into cache memory even if the temporal order of the deltas of the observed access sequence is not the same as that of the model access sequence. Thus, the claimed method is robust in relation to a change in the temporal order of the deltas of the observed access sequence with respect to the temporal order of the deltas in the model access sequence. The claimed method has been implemented during the execution of a program where the temporal order of the deltas of a pattern can change with respect to the order of these same deltas in a model access sequence. The results obtained show that the claimed method more often more correctly estimates the datum to be preloaded into the cache memory. The implementation of the claimed method has therefore rendered the execution of this program faster.

These embodiments of the prediction method furthermore exhibit the following advantages:

The construction of the model statistical distribution on the basis of a model access sequence logged during an earlier sliding window makes it possible to dynamically adapt the model statistical distribution in tandem with the execution of the program while limiting the amount of memory resource used.

The fact that the model access sequence immediately precedes the observed access sequence makes it possible to adapt the model statistical distribution very rapidly to a modification of the pattern which repeats during the execution of the program.

The calculation of a metric of similarity between the model and observed statistical distributions or the calculation of a prediction error makes it possible to automatically detect that the size of the model access sequence or of the observed access sequence is no longer adapted to the pattern which repeats during the execution of the program and therefore to automatically trigger a modification of this size during the execution of the program.

The use of a statistical prediction distribution in addition to the model statistical distribution makes it possible to test the consequences of modifying the size of the model access sequence so as to try to find a size which makes it possible to obtain better results than the current size of the model access sequence, doing so without degrading the current quality of the predictions that are provided.

The fact that the observed access sequence systematically contains the delta which occurred at the most recent instant t makes it possible to react more rapidly to a modification of the pattern which repeats during the execution of the program and therefore to adapt the prediction method more rapidly to this modification.

By predicting just a single datum to be preloaded it is made possible to limit the size of the memory resources required to record the predicted data. This also makes it possible to limit the pollution of the cache memory by needless replacements of lines of this cache memory.

The subject of the invention is also a method for executing a program, recorded in a main memory, by a microprocessor associated with a cache memory.

The subject of the invention is also an information recording medium comprising instructions for the execution of the claimed method, when these instructions are executed by an electronic calculator.

The subject of the invention is also an electronic module for predicting a datum to be preloaded into a cache memory.

The invention will be better understood from reading of the description which follows, given only by way of non-limiting example and with reference to the drawings in which:

FIG. 1 is a schematic illustration of an electronic processing unit,

FIG. 2 is a schematic illustration of the code of a computer program executed by the processing unit of FIG. 1;

FIG. 3 is a generic flowchart of an operating method of the processing unit of FIG. 1;

FIG. 5 is a timechart illustrating various access sequences used during the implementation of the method of FIG. 4;

In these figures the same references are used to designate the same elements. Hereinafter in this description, the characteristics and functions that are well known to the person skilled in the art are not described in detail.

Figure 4:
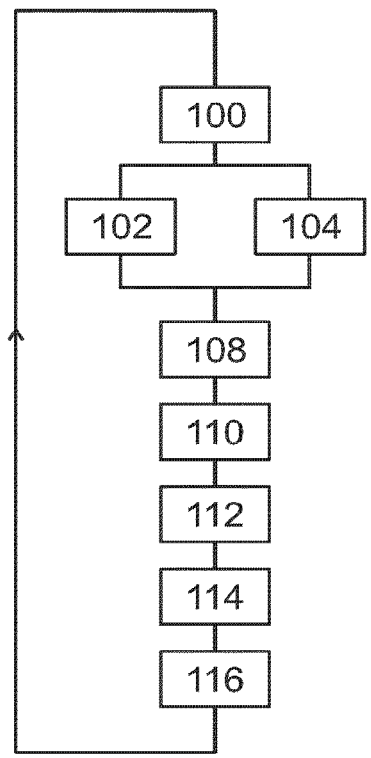
FIG. 4 is a flowchart of a method for predicting a datum to be preloaded into a cache memory, implemented in the method of FIG. 3.

FIG. 1 represents an electronic calculation unit 2. For example, the unit 2 is a computer. The hardware structure of such a computer is well known and only the elements necessary for the understanding of the invention are represented and described in greater detail. The unit 2 comprises:
 a programmable electronic calculator 4,
 a main memory 6,
 a nonvolatile memory 8, and
 a bus 10 for transferring data between the memories 8, 10 and the calculator 4.

The memory 6 is typically a fast memory which the calculator 4 accesses faster than it accesses the memory 8. Here, the memory 6 is a random-access memory. It may be a volatile memory such as a DRAM ("Dynamic Random Access Memory"). The memory 6 can also be a nonvolatile random-access memory such as a FLASH memory.

The memory 8 is for example a hard disk or any other type of nonvolatile memory. The memory 8 comprises a computer program 12 to be executed by the calculator 4, as well as data 14 to be processed by this program 12 when the latter is executed. During the execution of the program 12 by the calculator 4, the instructions of the program 12 as well as the data 14 are transferred initially into the memory 6 to access same more rapidly. In the memory 6, the instructions of the program 12 and the data 14 processed by this program bear the numerical references 16 and 18 respectively.

Typically, the data 14 contain data structured in the form of matrices or in the form of chained lists. In a matrix, each datum is identified by coordinates such as row and column numbers. In a chained list, each datum comprises a pointer to the previous and/or following datum of this list. An example of structured data is a digital image.

The processing of such structured data by the program 12 generally involves the execution of loops which are repeated a large number of times.

The calculator 4 comprises:
 a microprocessor 20 also known by the acronym CPU ("Central Processing Unit"),
 a cache memory 22,
 a preloading module 24 also known by the term "prefetcher",
 a buffer memory 26, and
 a bus 28 for transferring data between the microprocessor 20, the memory 22, the module 24, the buffer memory 26 and the bus 10.

The microprocessor 20 is able to execute a program. For this purpose, it furthermore comprises a PC register called the program counter or instruction pointer which contains the address of the currently executed instruction or of the following instruction to be executed by the microprocessor 20.

The cache memory 22 is here a cache memory of level L1. It makes it possible to store data which the microprocessor 20 can access faster than if they had only been stored in the memory 6. For example these data are instructions of the program 16 or data to be processed arising from the data 18. The memory 22 comprises for this purpose a memory 30 and a micro-calculator 32. The memory 30 contains the data which the microprocessor 20 can access more rapidly without having to read them in the memory 6. The micro-calculator 32 manages the recording and the erasure of data in the memory 30. In particular, when a new datum must be recorded in the memory 30, the micro-calculator 32 determines according to its own specific algorithm the datum or the data to be erased in the memory 30 so as to free up the space necessary for recording this new datum in the cache memory 22.

The function of the module 24 is to predict, before the microprocessor 20 has need thereof, precisely where the data are to be preloaded into the cache memory 22 and then to trigger the preloading of these data. Here, the module 24 is able to execute the methods of FIGS. 4, 8, 10 and 13. For this purpose, the module 24 can comprise a micro-calculator dedicated to this function. In this case, it comprises its own memory containing the instructions necessary for executing the methods of FIGS. 4, 8, 10 and 13 and its own microprocessor which executes these instructions. It may also be a dedicated integrated circuit. In this case, the instructions of the methods of FIGS. 4, 8, 10 and 13 are hard-wired into this integrated circuit.

Here, the memory 26 is a buffer memory used by the module 24 to temporarily record therein the datum or the data to be preloaded before they are transferred, if necessary, into the cache memory 22.

Here, the various components of the calculator 4 are fabricated on one and the same substrate such as a silicon chip.

FIG. 2 schematically represents a portion of the executable code of the program 12. In this figure, the vertical wavy lines indicate that not all the instructions of the program 12 have been represented. More precisely, only two read instructions "Ld @A1" and "Ld @A2" have been represented. Subsequently, these two instructions are called instructions I1 and I2 respectively. The instructions I1 and I2 cause the loading into registers of the microprocessor 20, when they are executed by this microprocessor 20, of a datum recorded, respectively, at the addresses @A1 and @A2 of the memory 6.

An arrow which starts from an instruction situated after the instruction I2 and which goes back up to an instruction situated before the instruction I1 indicates that the instructions I1 and I2 are situated inside a loop liable to be executed a large number of times. The instructions I1 and I2 are situated respectively at the addresses PC1 and PC2 of the program counter PC. Thus, when the value of the program counter PC is equal to PC1, this signifies that the instruction I1 is in the process of being executed or will be executed. When the value of the program counter PC is equal to PC2, this signifies that the instruction I2 is in the process of being executed or will be executed. Thus, even if the addresses @A1 and @A2 of the data to be read are equal, the value of the program counter PC makes it possible to unambiguously identify the read instruction currently being executed or which will be executed.

Typically, the addresses @A1 and @A2 are addresses calculated by the instructions which precede, respectively, the instructions I1 and I2. Thus, from one iteration to the next of the loop, the value of the addresses @A1 and @A2 can change whilst the values of the program counter PC identifying the instructions I1 and I2 do not change during these successive repetitions of the loop. The datum read at the address @A1 or @A2 can be an instruction executable by the microprocessor 20 or a datum to be processed by this microprocessor 20.

Henceforth, as described subsequently, the value of the program counter PC is used to reliably identify a given read instruction from among the set of read instructions that the program 12 contains.

The generic operation of the calculation unit 2 will now be described with reference to the method of FIG. 3.

On booting the execution of the program 12, during a step 50, this program 12 and the data 14 are loaded into the memory 6 and henceforth bear the numerical references 16 and 18.

During a step 51, the module 24 determines whether or not it is necessary to implement the preloading of data into the buffer memory 26. Accordingly, the module 24 verifies whether certain conditions are satisfied. If one of these conditions is not satisfied, it undertakes only a phase 52 of execution of the program 16 without preloading of data into the buffer memory 26. In the converse case, it undertakes a phase 60 of preloading data into the buffer memory 26. For example, during step 51, the module 24 verifies whether the sequence SA contains at least M+N deltas and, preferably, $T_{max}$ deltas.

During the phase 52, the microprocessor 20 executes the instructions of the program 16 so as to process the data 18. As illustrated in FIG. 2, during this execution, the microprocessor 20 is obliged to execute the instructions I1 and I2. These instructions I1 and I2 may be executed a large number of times when they are situated inside a loop as is the case here. Thus, for each of these read instructions, on the basis of the addresses successively accessed during each execution of this instruction, it is possible to construct a temporally ordered sequence of deltas. The construction of such a sequence of deltas is described in greater detail with reference to the method of FIG. 4. Typically, this delta sequence can exhibit a pattern which repeats. It is by utilizing the fact that a pattern repeats that it is possible to predict the next calculated delta and therefore the address which will be accessed during the next execution of this read instruction.

From now on, the operation of the unit 2 is described in the particular case of the instruction I1. Everything that is described in this particular case is also executed in parallel for the instruction I2 and for all the read instructions situated inside a loop.

During a step 54, in response to the execution of the instruction I1, the micro-calculator 32 determines whether or not the datum corresponding to the address @A1 is already contained in the memory 30.

In the affirmative, during a step 56, the cache memory 22 immediately returns the datum requested by the microprocessor 20 by way of the bus 28. In this case, typically, the microprocessor 20 waits between 2 and 15 clock cycles before obtaining the required datum and continuing the execution of the program 16.

If the datum corresponding to the address @A1 is not already situated in the memory 30, then a cache miss is present. In this case, during a step 58, the datum is read in the memory 6 and transferred into the cache memory 22. Thereafter, it is transferred from the cache memory 22 to the microprocessor 20 by way of the buses 10 and 28. In case of a cache miss, it is often necessary for the microprocessor 20 to wait 10 or 100 or 1000 times longer than during step 56 before obtaining the required datum and being able to continue the execution of the program 16. Thus, a cache miss slows down the execution of the program 16 considerably.

The phase 60 is similar to the phase 52 except that the module 24 moreover implements the preloading of data into the cache memory 22.

During a step 62, before the execution of the read instruction I1, the module 24 predicts the datum to be preloaded into the cache memory 22. The prediction must be as reliable as possible so as to maximize the probability that the datum required during the next execution of the instruction I1 by the microprocessor 20 is already situated in the cache memory 22 or in the buffer memory 26. A prediction method implemented by the module 24 is described in greater detail with reference to FIGS. 4 and 8.

On completion of step 62, during a step 64, if the datum to be preloaded is not already situated in the cache memory 22 or in the buffer memory 26, the module 24 loads it from the memory 6 and records it initially in the buffer memory 26. Typically, the buffer memory 26 is capable of containing at the maximum a line or a complete word of the memory 6. The size of the buffer memory 26 is therefore smaller than the size of the cache memory 22. It will be noted at this juncture that transferring a complete word or a complete line of the memory 6 into the buffer memory 26 does not generally take more time than transferring only the portion of the word or of the line of the memory 6 which contains the datum to be preloaded. Moreover, transferring a complete word or a complete line also makes it possible to limit the occurrence of cache misses.

Thereafter, the microprocessor 20 executes the read instruction I1.

Henceforth, during a step 66, the micro-calculator 32 verifies whether the address @A1 contained in the instruction I1 currently being executed corresponds to a datum already recorded in the cache memory 22 or in the buffer memory 26.

In the affirmative, during a step 68, if the datum is already recorded in the cache memory 22, then the micro-calculator 32 transfers it from the memory 30 to the microprocessor 20 as described for step 56. If the datum is not contained in the cache memory 22 but in the buffer memory 26, the micro-calculator 32 transfers this datum from the buffer memory 26 to the memory 30 and then transfers it from the memory 30 to the microprocessor 20 as described for step 56. Typically, the micro-calculator 32 firstly searches for the datum in the memory 30 and only thereafter in the buffer memory 26. Given that the size of the buffer memory 26 is very small, even when the datum is transferred from the buffer memory 26 via the memory 30, the microprocessor 20 obtains the desired datum almost as rapidly as if the latter were contained in the memory 30. In practice, it is the entire content of the buffer memory that is transferred into the memory 30.

If the datum corresponding to the address @A1 is not contained in the memory 30 and the buffer memory 26, during a step 70, this datum is read in the memory 6 and then transferred into the cache memory 22 before ultimately being transferred to the microprocessor 20. Accordingly, the method proceeds as described for step 58. Moreover, the module 24 triggers, only in this case, the transfer of the content of the buffer memory 26 to the cache memory 22. The micro-calculator 32 then manages the recording of the datum to be preloaded into the cache memory 22. Thus, in this embodiment, the datum to be preloaded is recorded in the cache memory 22 only if it is not used straight away by the microprocessor 20. The number of times that the datum to be preloaded must actually be transferred into the cache memory 22 is thus limited.

A method for predicting the datum to be preloaded, implemented by the module 24 during the execution of step 62, will now be described with reference to FIG. 4.

During a step 100, at each instant at which the microprocessor 20 executes a read instruction, the module 24 logs the identifier of this instruction and compares it with a list of identifiers of already executed read instructions. The identifier of the read instruction is here the address of this instruction contained in the program counter PC of the microprocessor 20.

If the logged identifier is not already contained in this list, during a step 102, the module 24 adds this identifier to this list and associates therewith the address @A of the datum to be read contained in this read instruction.

If the logged identifier is already contained in the list, then during a step 104, the module 24 calculates the difference, called delta, between the address to be read contained in this read instruction and the address to be read contained in the same read instruction during its previous execution. Thereafter, the calculated delta and the address to be read contained in the instruction currently being executed are recorded in the list associated with the identifier of this instruction.

In this list, the deltas calculated successively for one and the same read instruction are classed by order of instant of calculation. This forms a temporally ordered sequence of deltas calculated for one and the same read instruction. This sequence is called a sequence for access to the memory 6. For each read instruction executed, the module 24 stores an access sequence. In particular, for the instruction I1, the module 24 stores an access sequence SA (FIG. 5). Here, to limit the memory space required to store the various access sequences, the size of each access sequence is limited. Here, the size is limited to a maximum number $T_{max}$ of calculated deltas contained in one and the same access sequence. The number $T_{max}$ is strictly greater than four or six or ten. When an access sequence already contains $T_{max}$ calculated deltas and a new more recent delta has just been calculated by the module 24, the oldest delta of this access sequence is erased and the new calculated delta is added to this access sequence. Thus, each access sequence contains only the most recent calculated deltas $T_{max}$.

From now on, the operation of the module 24 is described in the particular case of the instruction I1. The operation of the module 24 for any one of the other read instructions executed by the microprocessor 20 is the same as that which will be described in this particular case.

For the digital applications given subsequently, it is assumed that the access sequence stored for the instruction I1 is the sequence SA represented in FIG. 5. In FIG. 5, the time axis is oriented from the most recent instant $t_0$ to the oldest instants. In this embodiment, the sequence SA contains:

an access sequence SO which contains only the N most recent successive deltas, and an access sequence SM which contains only the M successive deltas that are older than the deltas of the sequence SO.

The sizes N and M are predetermined integer numbers greater than or equal to 2 or 4 or 6. The aggregate of the sizes N and M is always less than or equal to the size $T_{max}$. In the example of FIG. 5, the size M is equal to 9 and the size N is equal to 8.

The access sequence SO is called the observed access sequence. It contains all the deltas calculated for each instant t of a sliding observation window $[t_1; t_0]$ ranging from the instant $t_0$ to the instant $t_1$. The instant t is an instant at which the instruction I1 is executed by the microprocessor 20 and therefore for which the module 24 calculates a delta and then stores it in the sequence SA. The instant to is the most recent instant t. The instant $t_1$ is the oldest instant t for which a delta of the sequence SO has been calculated.

The sequence SM contains all the deltas calculated for each instant t of a sliding window $[t_3; t_2]$ ranging from the instant $t_2$ to the instant $t_3$. The instants $t_2$ and $t_3$ are the most recent and the oldest instants t, respectively, for which deltas of the sequence SM have been calculated. In this embodiment, the sliding window $[t_3; t_2]$ moves at the same time as the window $[t_1; t_0]$ in such a way that the sequence SO always contains the N most recent calculated deltas and that the sequence SM always contains the M calculated deltas which immediately precede those of the sequence SO.

Here, the sequences SO and SM are distinct and not separated from one another by any calculated delta. Thus, the time interval $]t_1; t_2[$ does not contain any instant t of execution of the instruction I1.

In this embodiment, the sizes of the sequences SO and SM are always related by the following relation: N=M−1.

Each time that a new delta is added to the sequence SA, during a step 108, the oldest delta of this sequence SA is erased. Moreover, the module 24 updates and stores the sequences SO and SM subsequent to this modification of the sequence SA. Here, the new calculated delta is added to the sequence SO and becomes the most recent delta of this sequence. The other deltas are shifted by one unit to the left in the graphic of FIG. 5. The previous oldest delta of the sequence SO is erased from the sequence SO and becomes the most recent delta of the sequence SM.

During a step 110, the module 24 acquires a model statistical distribution DSM. A statistical distribution is an array which associates, with each class of possible value for the calculated deltas of an access sequence, a number which makes it possible to obtain the number of occurrences of the values of this class in this access sequence. To maximize the effectiveness of the prediction, the access sequence taken as model should correspond to a pattern which repeats several times in the access sequence during the execution of the program 12. In this embodiment, the access sequence taken as model is the sequence SM and the distribution DSM is constructed each time that the sequence SM is modified.

Figure 6:
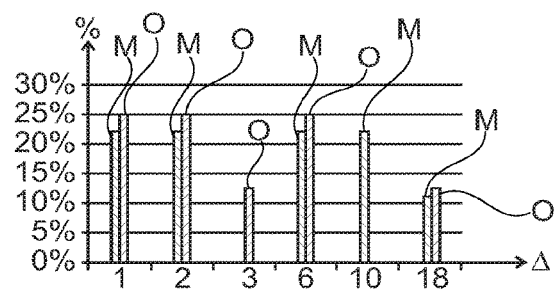
FIG. 6 is a histogram used to represent statistical distributions used during the implementation of the method of FIG. 4.

Here, each class of the distribution DSM corresponds to a single possible value for the calculated deltas. The number associated with each class is obtained by enumerating the number of occurrences of this class in the sequence SM and then by dividing this enumeration by the size M of the sequence SM. Thus, in this embodiment, this number therefore corresponds to a frequency of occurrence. The distribution DSM, thus constructed for the sequence SM of FIG. 5, is represented by bars M in the histogram of FIG. 6.

Thereafter, during a step 112, an observed statistical distribution DSO is constructed. The distribution DSO is the statistical distribution of the sequence SO. This distribution DSO is constructed as described with reference to step 110, except that it is the deltas contained in the sequence SO that are taken into account and not the deltas contained in the sequence SM. The distribution DSO, constructed for the sequence SO of FIG. 5, is represented by bars O in the histogram of FIG. 6.

During a step 114, the module 24 identifies the most deficient class in the distribution DSO constructed. The most deficient class is the class for which the difference NoDSM−NoDSO is maximal. NoDSM and NoDSO are the numbers associated by the distributions DSM and DSO, respectively, with the same class. Accordingly, the module 24 compares the distribution DSO, constructed during step 112, with the distribution DSM constructed during step 110. In the case represented in FIG. 6, the most deficient class is the class associated with the value "10". This signifies that if the sequence SO reproduces a pattern close to that which occurred during the sequence SM, then it is highly probable that the value of the next calculated delta will be equal to 10. For this reason, the value of the most deficient class identified during step 114 is called the predicted delta subsequently.

It will be noted that in contradistinction to the known prediction method, the method described here is robust in relation to permutations in the temporal order of occurrence of the deltas of a pattern which repeats several times during the execution of the program 12.

This method is also robust in relation to certain disparities between the observed pattern and the model of this pattern. For example, here, the sequence SO of FIG. 5 comprises the value "3" which does not exist in the sequence SM. However, this difference in no way disturbs the identification of the predicted delta.

During a step 116, the module 24 provides as prediction of the datum to be preloaded, the so-called "predicted" address of this datum in the memory 6. Accordingly, the module 24 calculates this predicted address on the basis of the delta predicted during step 114. For example, the module 24 adds to the last address accessed by the instruction I1 the value of the predicted delta. The last address accessed by the instruction I1 is contained in the list stored during steps 102 and 104.

Figure 7:
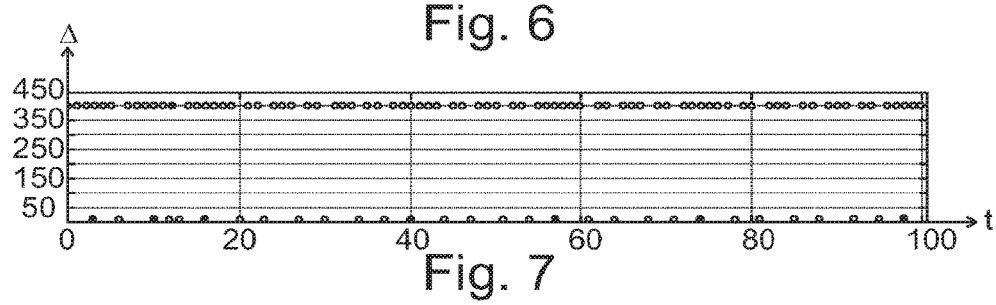
FIG. 7 is a timechart illustrating the evolution of the predictions provided by the method of FIG. 4 over time.

The method of FIG. 4 has been implemented and tested with a program which carries out a rotation of a digital image. The result obtained is illustrated by the graph of FIG. 7. The abscissa axis of this graph indicates the instants t at which the instruction I1 has been executed. For each of these instants t, the graph comprises a circle if the predicted delta and the actually observed delta are identical and a black dot if the observed delta is not superimposed with the predicted delta. This graph shows that very often the predicted delta is correct and therefore that the datum to be read is accessed very rapidly by the microprocessor 20. For example, in the simulations carried out, the predicted delta is different from the actually calculated delta in only 16% of cases.

Figure 8:
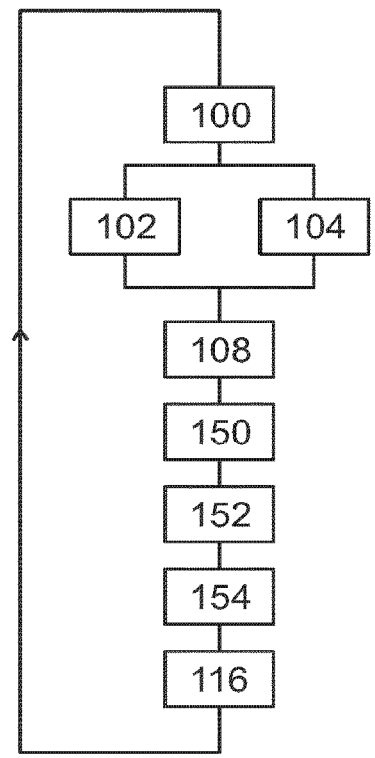
FIG. 8 is a flowchart of another embodiment of a method for predicting a datum to be preloaded into a cache memory, able to be implemented in place of the method of FIG. 4.

The method of FIG. 8 is identical to that of FIG. 4 except that steps 110, 112 and 114 are replaced with steps 150, 152 and 154.

Figure 9:
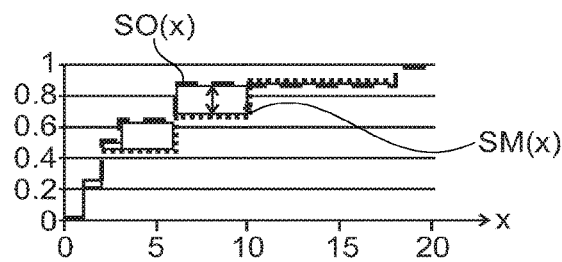
FIG. 9 is a schematic illustration of two distribution functions used in the method of FIG. 8.

Step 150 is identical to step 110 except that the constructed distribution DSM is stored in the form of a distribution function SM(x) known by the term "cumulative distribution function". The distribution function SM(x) indicates and returns the probability that the value of a calculated delta of the sequence SM has a value smaller than the threshold x. The function SM(x), obtained on the basis of the sequence SM of FIG. 5, is represented in the graph of FIG. 9. In this graph, the abscissa axis contains the various possible values for the threshold x.

The probability returned by the function SM(x) lies between 0 and 1, where "0" corresponds to a zero probability and "1" corresponds to a probability of 100%. For each possible value of the threshold x, the value of the function SM(x) is obtained by enumerating in the sequence SM the number of calculated deltas whose value is smaller than this threshold x. Thereafter, this enumeration is divided by the size M of the sequence SM.

Likewise, during step 152, the constructed distribution DSO is stored in the form of a distribution function SO(x). The function SO(x) is constructed as described for the function SM(x) except that the sequence SO is used to construct it in place of the sequence SM.

The identification of the most deficient class, during step 154, is then obtained by calculating for each value of x equal to a possible value of a calculated delta, the following difference: SM(x)−SM(x−1)−[SO(x)−SO(x−1)]. The most deficient class is equal to the value of x for which this difference is maximal. It will be noted that for the most deficient class we have the following two equalities: NoDSM=SM(x)−SM(x−1) and NoDSO=SO(x)−SO(x−1). Step 154 therefore identifies as the most deficient class the same class as that identified by implementing the method of FIG. 4.

Figure 10:
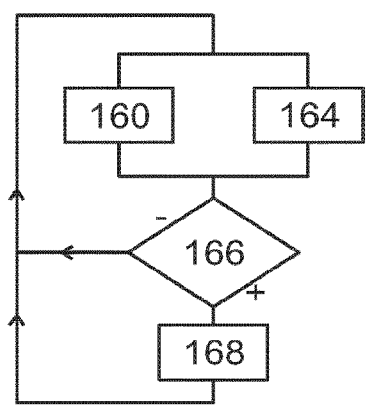
FIG. 10 is a flowchart of a method for automatically adapting the size of a model access sequence, usable in combination with the method of FIG. 4 or 8.

Preferably, in addition to the method of FIG. 4 or 8, the module 24 executes a method for dynamically tailoring the size of the sequences SM and SO. An example of one such dynamic tailoring method will now be described with reference to FIG. 10. As for the previous methods, the method of FIG. 10 is described in the particular case of the instruction I1.

At predetermined intervals, for example each time that the distribution DSM or the distribution DSO is modified, during a step 160, the module 24 calculates a metric po of similarity between the distributions DSM and DSO. For example, here, the module 24 implements the Cramer-Von Mises non-parametric hypothesis test for two samples. This test is used to inter-compare the functions of the distribution SM(x) and SO(x). Accordingly, beforehand, these functions SM(x) and SO(x) are constructed, for example, as described with reference to steps 150 and 152. This hypothesis test is well known and only its main characteristics are recalled here. The distance w between the two statistical distributions is defined by the following relation:

$$w^2 = \int_{-\infty}^{+\infty} [SM(x) - SO(x)] dSO(x)$$

The similarity statistic T of the test in the case where the two samples correspond, respectively, to the sequences SM and SO, is given by the following relation:

$$T = N\omega^2 = \frac{U}{NM(N+M)} - \frac{4MN - 1}{6(M+N)}$$

where N and M are the sizes, respectively, of the sequences SO and SM, and
U is defined by the following relation:

$$U = N \sum_{i=1}^{N} (r_i - i)^2 + M \sum_{j=1}^{M} (s_j - j)^2$$

where $r_i$ and $s_j$ are respectively the rank of the deltas, respectively of the sequences SM and SO, in the sequence SA.

In this embodiment, the similarity metric po is obtained on the basis of the statistic T thus calculated. Here, the metric po is equal to the p-value. For example, the module 24 calculates the metric po with the aid of the following relation:

$$p = \frac{T - \varepsilon T}{\sqrt{45 \cdot \text{Var}(T)}} + \frac{1}{6}$$

where:
p is the p-value po,
εT is defined by the following relation:

$$\varepsilon T = \frac{1}{6} + \frac{1}{6(M+N)}$$

Var(T) is defined by the following relation:

$$\text{Var}(T) = \frac{1}{45} \cdot \frac{M+N+1}{(M+N)^2} \cdot \frac{4MN(M+N) - 3(M^2+N^2) - 2MN}{4MN}$$

If the metric po exceeds a predetermined threshold $S_{po}$, the distributions DSM and DSO are considered to be similar. In the converse case, they are considered to be different.

In parallel, during a step 164, and for the same instant t as that for which the metric po is calculated, the module 24 calculates a prediction error Eo whose value is all the greater the greater the number of erroneous predictions. For example, here, the error Eo is an error rate equal to the ratio NPC/NPT, where:

NPC is the number of times that the predicted delta identified for the instant t is equal to the delta actually calculated subsequently for this instant t, and NPT is the total number of instants t for which a predicted delta has been identified.

Typically the ratio NPC/NPT is calculated taking into account only the last C instants t, where C is a predetermined number greater than two or five. Here, C is equal to five.

Thereafter, during a step 166, the module 24 automatically determines whether it must modify the size of the sequences SM and SO. For example, for this purpose, the module 24 verifies whether the following two conditions are simultaneously fulfilled:

$po \leq S_{po}$, and  (condition 1)

$Eo \geq S_{Eo}$.  (condition 2)

When condition 1) is satisfied, this signifies that the distribution DSM is substantially different from the distribution DSO. When condition 2) is satisfied, this signifies that the prediction error rate is great.

The thresholds $S_{po}$ and $S_{Eo}$ are predetermined thresholds which are adjusted experimentally so that the method for dynamically tailoring the size of the sequences SM and SO operates correctly whatever program is executed. The threshold $S_{po}$ typically lies between 0 and 1. Here, its value is chosen greater than or equal to 0.9 and, preferably, greater than or equal to 0.95 or 0.99.

If the two conditions 1) and 2) are simultaneously satisfied, the module 24 immediately undertakes a step 168, during which the sizes of the sequences SM and SO are modified. For example, it increments by 1 the sizes M and N. If the size M attains a predefined maximum size $TM_{max}$, the size M is reinitialized to a minimum value greater than or equal to 2 or 4. The size M can also be reinitialized to the value zero. In this case, the preloading of data into the buffer memory 26 is deactivated at least for the following M+N instants t.

If one of the two conditions 1) and 2) is not satisfied, the sizes of the sequences SM and SO are not modified.

Figure 11:
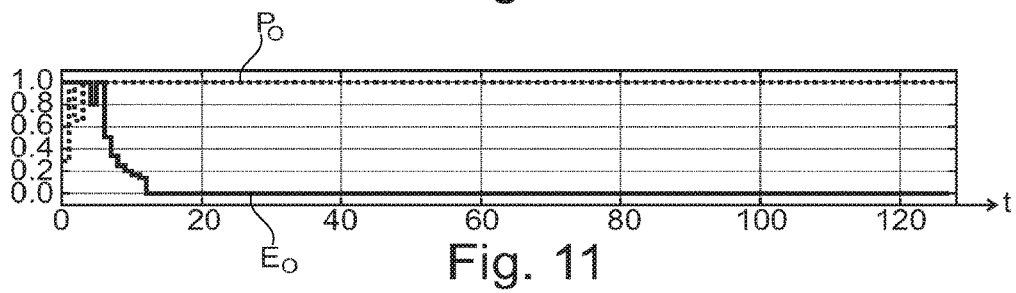
FIG. 11 is a timechart illustrating the evolution over time of two quantities Po and Eo calculated by the method of FIG. 10.
Figure 12:
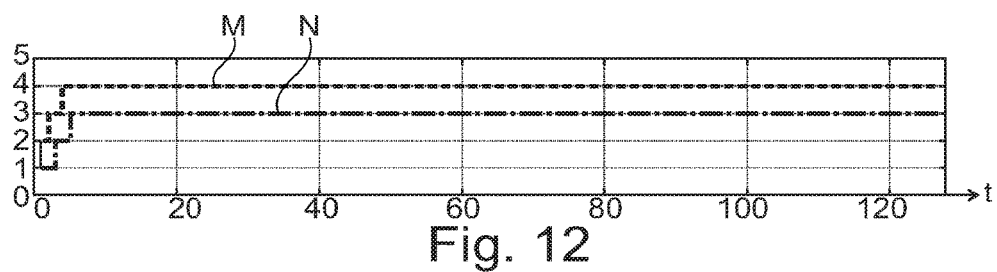
FIG. 12 is a timechart illustrating the evolution over time of the sizes M and N of two access sequences calculated by the method of FIG. 10.

The methods of FIGS. 8 and 10 have been jointly implemented during the execution of the program 12 which executes a rotation of a digital image. The graph of FIG. 11 represents the evolution of the metric po and of the error Eo over time. The graph of FIG. 12 represents the evolution over time of the sizes M and N of the sequences SM and SO during the execution of this same program 12. It is noted that the size of the sequences SM and SO rapidly latches on to a correct value.

However, the method of FIG. 10 does not always make it possible to find the optimal size M. For example, if the access sequence comprises a repeated alternation of a first pattern and of a second pattern, the method of FIG. 10 risks to equate the size M to a value equal to the size of the first pattern or of the second pattern. For example, the size of the first pattern is equal to four successive deltas and the size of the second pattern is equal to 3 successive deltas. In this type of situation, the error Eo can sometimes still be minimized by taking the size M equal to the size of a window which systematically encompasses an occurrence of the first pattern and an occurrence of the second pattern. For example, a beneficial choice of the size M if the first and second patterns are contiguous is to take, in this example, M=7(4+3). However, the method of FIG. 10 stops incrementing the size M as soon as it has found a size which simultaneously satisfies conditions 1) and 2). Thus, if conditions 1) and 2) are satisfied simultaneously with M=3 or M=4, the module 24 will not explore the larger sizes and therefore the size M=7. Moreover, it may very well happen that the error Eo is worse for M=5 and M=6 than for M=3 or 4. Hence, continuing to increase the size M although conditions 1) and 2) are already satisfied risks increasing the prediction error. To remedy this drawback, it is proposed to execute in addition to the method of FIG. 10 or in place of this method, a method for exploring various possible sizes for the sequence SM. An embodiment of such a method will now be described with reference to the method of FIG. 13.

At predetermined intervals, for example as soon as the size M of the sequence SM is latched onto a given value, during a step 180, the module 24 stores a so-called "prediction" model access sequence SMP and an observed access sequence SOP. An example of sequences SMP and SOP is represented in FIG. 5. The sequence SMP contains only the MP deltas calculated successively for each instant t lying within a sliding window [$t_5$; $t_4$]. The instants $t_4$ and $t_5$ are the most recent and the oldest instants, respectively, for which a delta of the sequence SMP has been calculated. Here, the size MP is strictly greater than the size M. Thus, the instant $t_5$ is prior to the instant $t_3$. The sequence SOP contains for its part only the NP deltas calculated successively for each instant t lying within a sliding window [$t_4$; $t_0$]. In this embodiment, the sizes MP and NP are inter-linked by the same relation as that which links the sizes M and N. Thus, the size NP is equal to MP−1. For the implementation of the method of FIG. 13, the sequence SA stored for the instruction I1 during steps 100, 102 and 104 is the same. Indeed, typically, the size $T_{max}$ is greater than or equal to M+N+1 and, preferably, greater than or equal to M+N+4 or M+N+6. Just as for the sequences SM and SO, each updating of the sequence SA causes a corresponding updating of the sequences SMP and SOP.

During a step 182, the module 24 constructs so-called "prediction" statistical distributions DSMP and DSOP on the basis, respectively, of the sequences SMP and SOP. To do this, it proceeds as described with reference to steps 150 and 152 except that it is the sequences SMP and SOP which are used in place, respectively, of the sequences SM and SO.

During a step 184, the module 24 calculates a metric pp of similarity between the distribution DSMP and the distribution DSOP. For example, accordingly, it proceeds as described with reference to step 160.

During this step 184, the module 24 also calculates a prediction error Ep. Accordingly, it identifies a predicted delta by comparing the distribution DSMP with the distribution DSOP. For this purpose, it proceeds as described with reference to steps 114 or 154 except that the distributions DSMP and DSOP are used in place, respectively, of the distributions DSM and DSO. Thereafter, it calculates the error Ep in the same manner as was described for the error Eo.

If the metric pp and the error Ep are better than, respectively, the metric po and the error Eo that were calculated at the same moment by using the sequence SM, then it undertakes a step 186 wherein the size M is modified so that it is equal to the size MP of the sequence SMP.

In the converse case, during a step 188, the size MP of the sequence SMP is modified so as to explore other possible sizes of the sequence SM. For example, the size MP is incremented by 1. If the size MP attains the maximum size $TM_{max}$, the method is stopped or reinitialized with a smaller size MP. During step 188, the size of the sequence SM is not modified.

Figure 13:
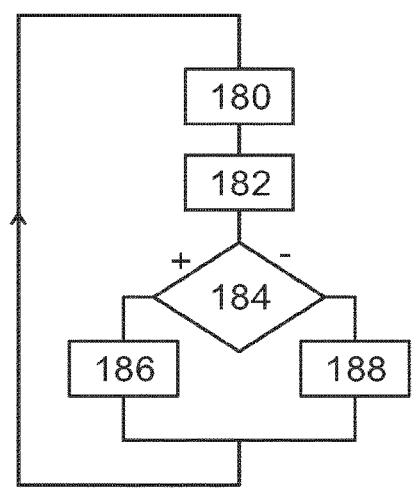
FIG. 13 is a flowchart of a method for automatically adapting the size of the access sequences, usable in combination with the method of FIG. 4 or 8.

Thus, by virtue of the method of FIG. 13, the module 24 can find an optimal size M for the sequence SM.

Numerous other embodiments are possible. For example, what was described in the particular case of read instructions can also be implemented during the writing of a datum in the memory 6. Indeed, the writing of a datum in the memory 6 can be accelerated by preloading into the cache memory 22 the pre-existing datum situated at the address where the datum must be written. Thereafter, when a write instruction is executed, it is the pre-existing datum recorded in the cache memory 22 which is replaced with a new datum. The writing of the new datum in the cache memory 22 is faster than writing directly in the memory 6. The new datum is then moved subsequently from the cache memory 22 to the memory 6 and then replaces the pre-existing datum which was still situated therein. The latter step of transferring a datum between the cache memory 22 and the memory 6 can be done without interrupting the execution of the program by the microprocessor 20. In this case, the writing of a datum in the memory 6 therefore involves the execution of an instruction to read the pre-existing datum. What was described previously can therefore be applied to this read instruction to accelerate its execution and therefore the execution of the writing in the memory 6. In the latter case, the address to be predicted corresponds to the address that contains the pre-existing datum.

The calculation unit can comprise several levels of cache memory, hierarchized by access speed. These various levels of cache memory are disposed between the microprocessor 20 and the main memory 6. For example, the calculation unit can comprise three levels of cache memory commonly called level L1, L2 and L3. Access to the cache memory of level L1 is faster than access to the cache memory of level L2. Access to the cache memory of level L2 is faster than access to the cache memory of level L3. Finally, access to the cache memory of level L3 is faster than access to the memory 6. Generally, the sizes of these cache memories vary, decreasing on approaching the memory which the microprocessor accesses fastest. In general, a datum is firstly recorded in the memory 6. Thereafter, if useful, it is transferred into the cache memory of level L3. If necessary, it is thereafter transferred from the cache memory of level L3 to the cache memory of level L2. Finally, again if necessary, it is transferred from the cache memory of level L2 to the cache memory of level L1. For example, it is not possible to transfer a datum from the memory 6 directly into a cache memory of level L1 or L2.

The cache memory of level L2 can be embodied on the same substrate as that used to embody the microprocessor 20. Currently, the cache memory of level L3 is usually a memory embodied on a chip distinct from that where the microprocessor is embodied.

The method for predicting a datum to be preloaded described in the particular case of the cache memory of level L1 can also be implemented to predict the datum to be preloaded in any of these levels of cache memory. In particular, the method described can be implemented simultaneously for each of these levels of cache memory.

The buffer memory 26 can be omitted. In this case, the datum predicted by the method of FIG. 4 is recorded directly in the cache memory 22 instead of being recorded firstly in the buffer memory 26.

The preloading of data into the buffer memory 26 is not always systematically activated. For example, the preloading of the data into the buffer memory 26 is activated only if the read instructions are situated in the lowest level loop, that is to say that there does not exist any other loop situated inside this loop and containing the same read instructions. The activation of the preloading of data into the buffer memory 26 is for example triggered by a specific instruction contained in the code of the executed program.

Steps 110 and 112 of constructing the statistical distributions DSM and DSO can be carried out in parallel or in the reverse order from FIG. 4.

As a variant, at a given instant, it is possible to predict several data to be preloaded rather than a single datum. For example, the size of the sequence SO is taken equal to M−α, where α is an integer number strictly greater than 1 and strictly less than M−2 or M/2. During step 114 or 154, α deltas corresponding to the α most deficient classes of the distribution DSO are identified. Thereafter, α predicted addresses are constructed, each on the basis of one of these predicted deltas. For example, a may be equal to 2, 3 or 4.

In another embodiment, a class of the distributions DSM and DSO does not correspond to a single possible value for calculated deltas but to a continuous span of possible values for these calculated deltas. For example, the first class contains the values lying between 0 and 3, the second class the values lying between 4 and 6 and so on and so forth. Thus, each class contains several possible values for the deltas. However, as previously, the classes are preferably mutually disjoint and do not overlap one another. Henceforth, during step 114 or 154, the identification of the most deficient class amounts to identifying several predicted deltas. Thereafter, several predicted addresses are constructed, each on the basis of a respective predicted delta. Thus, in this variant, the method provides several predicted addresses as prediction of several data to be preloaded into the cache memory 22. Preferably, in this embodiment, the size of a class is chosen equal to the size of a line of the cache memory 22 or of a block of the cache memory 22.

As a variant, the sequence SM is separated from the sequence SO by one or more calculated deltas. Thus, in this variant, the sequences SM and SO are disjoint.

The sequence SM is not necessarily an access sequence constructed on the basis of the deltas calculated during an earlier sliding window $[t_3; t_2]$. For example, as a variant, the sequence SM contains the deltas successively calculated between fixed instants $t_3$ and $t_2$ which no longer evolve thereafter as and when new deltas are calculated. By way of illustration, in this case, the storage of the sequence SM is triggered by instructions incorporated into the program 12.

The sequence SM can also be a prerecorded sequence loaded into memory at the start of the execution of the program 12 as described in patent application U.S. Pat. No. 5,305,389 A1.

As a variant, the sequence SO does not contain the delta calculated for the most recent instant t.

The relation which links the size of the sequence SO to the size of the sequence SM can be different. For example, this relation is defined by the following equation: N=M−β, where β is an integer number, preferably greater than or equal to two and less than or equal to M−2. In another variant, the size N of the sequence SO can be chosen greater than the size M of the sequence SM. In this case, β is an integer number less than or equal to −1 and, for example, greater than or equal to −5 or −3.

The distribution DSM is not necessarily constructed on the basis of an access sequence logged by the module 24. As a variant, the distribution DSM is a statistical distribution prerecorded in the memory 8 and loaded by the program 12 at the start of its execution or during its execution. In this case, to construct the distribution DSM, it is not necessary to store the sequence SM.

The distribution DSM or DSO can be stored in forms other than a histogram or than a distribution function. For example, each statistical distribution is constructed and stored as a probability density.

Other procedures are possible for calculating the metric of similarity between the distributions DSM and DSO. For example, a calculation of the correlation between the distributions DSM and DSO also provides a measure of the similarity between these two statistical distributions. Another hypothesis test such as the Smirnov non-parametric hypothesis test can also be used in place of the Cramer-Von Mises test. In the case of the Smirnov hypothesis test, the similarity metric po can also be a p-value. It is calculated, for example, with the aid of the following relation:

$$p(y) = 2\sum_{k=1}^{K} (-1)^{k+1} e^{(-2k^2 y^2)}$$

where:
p(y) is the value of the similarity metric po,
K is a predetermined positive integer number, typically greater than 3 or 50 or 100,
y is defined by the following relation:

$$y = \sqrt{n}\Delta_n$$

Δn is the statistic of the Smirnov test. It is the equivalent of the statistic T of the Cramer-von Mises test. It lies between 0 and 1. It also corresponds to the maximum difference between the two statistical distributions.

n is defined by the following relation:

$$n = \frac{NM}{N+M}$$

At a given instant, metrics of similarity between several different distributions DSM and the distribution DSO can be calculated. Thereafter, the distribution DSM which is most similar to the distribution DSO is used to identify the predicted delta. For example, the various distributions DSM are each constructed on the basis of a sequence SM having a different size M from the other sequences SM used to construct the other distributions DSM. Hence, this makes it possible to simultaneously test, for a given instant t, various possible sizes of the sequence SM so as to select, from among these various tested sizes, the most appropriate size to identify the predicted delta. Thereafter, it is this most appropriate size that is used for the sequence SM during the following iterations of the method.

Rather than using a p-value as similarity metric, it is also possible to use, for example, the statistic T or $\Delta_n$ directly and to compare it with a predetermined threshold. In this case, the value of the predetermined threshold is typically obtained on the basis of a table which gives the value of this threshold as a function of the desired degree of confidence.

Other procedures for calculating the prediction error Eo are possible. For example, the number C is chosen much larger, or indeed equal to infinity. It is also possible to calculate a prediction error which is moreover dependent on the difference, in absolute value, between the delta predicted for the following instant t identified in step 114 or 154 and the delta actually calculated for this instant t.

Other criteria are possible for triggering the modification of the size of the sequences SM and SO. For example, as a variant, just one of the conditions chosen from among the conditions 1) and 2) is used.

Other embodiments of step 168 are possible. For example, the size M is incremented 2 by 2 and not 1 by 1.

As a variant, the method of FIG. 13 is implemented without implementing the method of FIG. 10. For example, the method of FIG. 13 is combined with the implementation of the method of FIG. 4. In this case, a modification of the size of the sequences SM and SO is caused only by the execution of the method of FIG. 13. In another variant, the method of FIG. 13 is used to explore possible sizes MP for the sequence SMP smaller than the size M of the sequence SM currently used.

For one and the same given instant t, the method of FIG. 13 can be executed for several different sizes MP. This makes it possible to explore at a given instant several possible sizes for the sequence SM.

In another embodiment, a library of several different distributions DSM is recorded in the memory 6. Thereafter, at predetermined intervals, the module 24 selects from this library the distribution DSM to be used. For example, to select the distribution DSM, it calculates for each distribution DSM recorded in this library the similarity metric and/or the prediction error as described with reference to step 184. Thereafter, it selects the distribution DSM which maximizes the similarity metric and/or which minimizes the prediction error. In this variant, it is not necessary to store and to use the sequence SM.

The preloading module 24 can also be integrated inside the microprocessor 20. It can also be embodied in software form. In this case, it is the microprocessor 20 which executes the instructions recorded in the memory of the module 24. In the latter case, the module 24 is an information recording medium containing the instructions necessary for the execution of the methods of FIGS. 4, 8, 10 and 13. The module 24 can also be integrated into the cache memory 22. In this case, it is the micro-calculator 32 that is adapted for carrying out all the functions of the module 24.

The invention claimed is:

1. A method for predicting a datum to be preloaded into a cache memory, said method comprising:
   a) for each instant t at which a microprocessor executes an instruction to read a datum necessary for the execution of a program, calculating a difference, called delta, between the address of the datum to be read contained in said read instruction executed at the instant t and the address of the datum to be read contained in said read instruction during its previous execution at an instant t−1, two read instructions being the same if they both correspond to a same value of the program counter of the microprocessor,
   b) storing an observed access sequence containing only the N deltas calculated successively for each instant t lying within a sliding window $[t_1; t_0]$, where the instants $t_0$ and $t_1$ are equal to the most recent and the oldest instants t, respectively, for which a delta of the observed access sequence has been calculated, and the number N is a predetermined integer number greater than or equal to two,
   wherein the method also comprises:
   c) acquiring a, so-called "model", statistical distribution of the deltas of a model access sequence, said model statistical distribution comprising:
      classes of possible values for the deltas, and associated with each of these classes,
      a number dependent on the number of occurrences of said class in the model access sequence,
   d) the construction of a, so-called "observed", statistical distribution of the deltas of the observed access sequence,
   e) identifying in the observed statistical distribution, by comparing it with the model statistical distribution, of a most deficient class for which the difference NoDSM−NoDSO is maximal, where NoDSM and NoDSO are the numbers of occurrences of said class that are deduced, respectively, from the model statistical distribution and from the observed statistical distribution,
   f) providing as prediction of the datum to be preloaded into the cache memory before the next execution of the same read instruction, of at least one predicted address where the datum to be preloaded is contained, said predicted address being constructed on the basis of the most deficient class identified during step e).

2. The method as claimed in claim 1, in which, during step c), acquiring the model statistical distribution comprises:
   storing a model access sequence containing only the last M deltas calculated successively for each instant t lying within a sliding window $[t_3; t_2]$ prior to the sliding window $[t_1; t_0]$, where the instants $t_2$ and $t_3$ are equal to the most recent and the oldest instants t, respectively, for which a delta of the model access sequence has been calculated, and the number of deltas calculated for instants t lying between the instants $t_2$ and $t_1$ is a predetermined constant, and the number M is a predetermined integer number greater than or equal to two, and each time that a new model access sequence is stored, constructing the model statistical distribution on the basis of the deltas of said stored model access sequence.

3. The method as claimed in claim 2, in which, systematically, there does not exist any instant t, lying between the instants $t_2$ and $t_1$, for which a delta is calculated so that the model access sequence always immediately precedes the observed access sequence.

4. The method as claimed in claim 1, in which the method comprises:
calculating a similarity metric whose value varies in a monotonic manner as a function of the size of the differences between the model and observed statistical distributions and/or the calculation of a prediction error whose value varies in a monotonic manner as a function of the number of times for which the address predicted on the basis of the observed access sequence during the sliding window $[t_1; t_0]$ is different from the address of the datum to be read actually contained in the read instruction executed at the following instant $t_0+1$, and
in response to the crossing of a predetermined threshold by the calculated similarity metric and/or by the calculated prediction error, modifying the number N of deltas contained in the observed access sequence or of the number M of deltas contained in the model access sequence.

5. The method as claimed in claim 1, in which the method comprises:
calculating a first similarity metric whose value varies in a monotonic manner as a function of the size of the differences between the model and observed statistical distributions and/or the calculation of a first prediction error whose value varies in a monotonic manner as a function of the number of times for which the address predicted on the basis of the model statistical distribution and of the observed access sequence during the sliding window $[t_1; t_0]$ is different from the address of the datum to be read actually contained in the read instruction executed at the following instant $t_0+1$, and
storing a, so-called "prediction", access sequence containing only P deltas calculated successively for each instant t lying within a sliding window $[t_5; t_4]$ prior to the sliding window $[t_1; t_0]$, where the instants $t_4$ and $t_5$ are equal to the most recent and the oldest instants t, respectively, for which a delta of the prediction access sequence has been calculated, and the number P is a predetermined integer number different from the number M,
constructing a, so-called "prediction", statistical distribution on the basis of the deltas of the prediction access sequence,
calculating a second similarity metric and/or of a second prediction error by using the statistical prospection distribution in place of the model statistical distribution, and then
if the second calculated similarity metric or the second calculated prediction error is better than, respectively, the first calculated similarity metric or the first calculated prediction error, then the number M is taken equal to the number P for the following iteration of the method, otherwise the number M remains unchanged.

6. The method as claimed in claim 1, in which the observed access sequence systematically contains the delta calculated on the basis of the address of the datum to be read contained in the most recently executed read instruction.

7. The method as claimed in claim 1, in which, at each iteration of step e), a single predicted address is provided.

8. A method for executing a program, recorded in a main memory, by a microprocessor associated with a cache memory, said method comprising:
executing by the microprocessor of an instruction to read a datum necessary for the execution of the program, said instruction containing the address where said datum is recorded in the main memory,
if the datum corresponding to the address contained in the read instruction to be executed is situated in the cache memory, reading said datum in the cache memory, and otherwise reading said datum in the main memory or in another memory different from the cache memory,
before the microprocessor executes the same read instruction another time, predicting the datum to be preloaded into the cache memory and the preloading of the predicted datum into the cache memory or into a buffer memory,
wherein the predicting is carried out in accordance with claim 1.

9. An information recording medium, which comprises instructions for the execution of a method according to claim 1, when these instructions are executed by a microprocessor.

10. An electronic module for predicting a datum to be preloaded into a cache memory, said module being designed to:
a) for each instant t at which a microprocessor executes an instruction to read a datum necessary for the execution of a program, calculate a difference, called delta, between the address of the datum to be read contained in said read instruction executed at the instant t and the address of the datum to be read contained in said same read instruction during its previous execution at an instant t−1, two read instructions being the same if they both correspond to the same value of the program counter of the microprocessor,
b) storing an observed access sequence containing only the N deltas calculated successively for each instant t lying within a sliding window $[t_1; t_0]$, where the instants $t_0$ and $t_1$ are equal to the most recent and the oldest instants t, respectively, for which a delta of the observed access sequence has been calculated, and the number N is a predetermined integer number greater than or equal to two,
wherein the electronic module is also designed to:
c) acquire a, so-called "model", statistical distribution of the deltas of a model access sequence, said model statistical distribution comprising:
classes of possible values for the deltas, and associated with each of these classes,
a number dependent on the number of occurrences of said class in the model access sequence,
d) construct a, so-called "observed", statistical distribution of the deltas of the observed access sequence,
e) identify in the observed statistical distribution, by comparing it with the model statistical distribution, the most deficient class, that is to say the class for which the difference NoDSM−NoDSO is maximal, where NoDSM and NoDSO are the numbers of occurrences of said class that are deduced, respectively, from the model statistical distribution and from the observed statistical distribution,
f) provide as prediction of the datum to be preloaded into the cache memory before the next execution of the same read instruction, at least one predicted address where the datum to be preloaded is contained, said predicted address being constructed on the basis of the most deficient class identified during step e).

* * * * *